United States Patent
Matsunaga et al.

(10) Patent No.: US 10,481,258 B2
(45) Date of Patent: Nov. 19, 2019

(54) VEHICLE CONTROL APPARATUS AND VEHICLE CONTROL METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Syogo Matsunaga, Kariya (JP); Jun Tsuchida, Okazaki (JP); Ichiro Aizawa, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 225 days.

(21) Appl. No.: 15/562,194

(22) PCT Filed: Mar. 10, 2016

(86) PCT No.: PCT/JP2016/057489
§ 371 (c)(1),
(2) Date: Sep. 27, 2017

(87) PCT Pub. No.: WO2016/158278
PCT Pub. Date: Oct. 6, 2016

(65) Prior Publication Data
US 2018/0067206 A1 Mar. 8, 2018

(30) Foreign Application Priority Data
Mar. 31, 2015 (JP) .................. 2015-072954

(51) Int. Cl.
*G06F 17/10* (2006.01)
*G06G 7/78* (2006.01)
(Continued)

(52) U.S. Cl.
CPC .............. *G01S 13/931* (2013.01); *B60T 7/12* (2013.01); *B60T 7/22* (2013.01); *B60W 30/09* (2013.01);
(Continued)

(58) Field of Classification Search
None
See application file for complete search history.

(56) References Cited

U.S. PATENT DOCUMENTS

| 6,246,949 B1 | 6/2001 | Shirai et al. |
| 2006/0103927 A1 | 5/2006 | Samukawa et al. |

(Continued)

FOREIGN PATENT DOCUMENTS

| JP | H09-236659 A | 9/1997 |
| JP | H10-132939 A | 5/1998 |

(Continued)

*Primary Examiner* — Bhavesh V Amin
(74) *Attorney, Agent, or Firm* — Knobbe, Martens, Olson & Bear, LLP

(57) ABSTRACT

A driving assist ECU which performs collision avoidance control for the target based on a detection result of a target around an own vehicle by a radar device acquires, at a predetermined cycle, angle deviation information of the radar device in the vertical direction, the angle deviation information being calculated from a detection position of the target, and calculates an axis deviation angle by performing statistical processing of a history of the angle deviation information acquired after activation, the axis deviation angle being a deviation amount of a mounting angle of the radar device in the vertical direction. Until a predetermined initial time period elapses after the activation, a limitation is imposed on the collision avoidance control for, among targets detected by the radar device, a stationary target which is a target corresponding to a stationary object.

6 Claims, 3 Drawing Sheets

(51) Int. Cl.
*G08G 1/16* (2006.01)
*G01S 13/93* (2006.01)
*B60T 7/12* (2006.01)
*B60W 30/09* (2012.01)
*B60T 7/22* (2006.01)
B60R 21/013 (2006.01)
G01S 7/40 (2006.01)

(52) U.S. Cl.
CPC ............ G08G 1/165 (2013.01); G08G 1/166 (2013.01); *B60R 21/013* (2013.01); *B60T 2201/022* (2013.01); *G01S 2007/4034* (2013.01); *G01S 2013/935* (2013.01); *G01S 2013/9346* (2013.01); *G01S 2013/9353* (2013.01)

(56) References Cited

U.S. PATENT DOCUMENTS

| | | |
|---|---|---|
| 2007/0146196 A1 | 6/2007 | Oka et al. |
| 2010/0052417 A1 | 3/2010 | Aoba et al. |

FOREIGN PATENT DOCUMENTS

| | | |
|---|---|---|
| JP | 2007-290708 | 11/2007 |
| JP | 2008-186384 | 8/2008 |
| JP | 2011-232230 A | 11/2011 |
| JP | 2012-154630 | 8/2012 |
| JP | 2013-019799 | 1/2013 |
| JP | 2014-137288 A | 7/2014 |
| JP | 2016-191682 | 11/2016 |
| JP | 2016-191685 | 11/2016 |

VEHICLE CONTROL APPARATUS AND VEHICLE CONTROL METHOD

CROSS-REFERENCE TO RELATED APPLICATIONS

This application is based on Japanese Patent Application No. 2015-72954 filed on Mar. 31, 2015, the contents of which are incorporated herein by reference.

TECHNICAL FIELD

The present invention relates to a vehicle control apparatus which performs collision avoidance control for avoiding a collision of an own vehicle with a target which is present ahead of the own vehicle and is detected by a target detection device and to a vehicle control method performed by the vehicle control apparatus.

BACKGROUND ART

Pre-crash safety (PCS) has been realized which reduces or prevents damage from a collision between an own vehicle and an obstacle (target), such as another vehicle, a pedestrian, or a road structure, which is present ahead of the own vehicle and is detected by a target detection device such as an imaging device or a radar device. According to PCS, time to collision (TTC) which is time until an own vehicle collides with an obstacle is obtained on the basis of a relative distance between the own vehicle and the obstacle and a relative speed or a relative acceleration between the own vehicle and the obstacle. Then, on the basis of the time to collision, a driver of the own vehicle is notified by a notification device that the own vehicle is approaching the obstacle, or a braking device of the own vehicle is activated.

However, in a case where axis deviation occurs in which a mounting angle of the target detection device is inclined, an obstacle which is not actually located ahead of the own vehicle is erroneously determined to be located ahead of the own vehicle. The axis deviation of the target detection device can be caused by vibrations occurring while the own vehicle is traveling, an occurrence of a minor collision with the own vehicle, or the like.

Thus, the axis deviation of the target detection device has been conventionally detected. For example, in a case where a radar device is used as the target detection device, deviation information on deviation of a mounting angle of the radar device in a horizontal direction is acquired on the basis of a movement path of a road-side object which has been detected by the radar device. Then, an axis deviation angle of the radar device is calculated by performing statistical processing of a history of the deviation information on the deviation in the horizontal direction (see Patent Literature 1).

CITATION LIST

Patent Literature

[PTL 1]: JP Hei10-132939 A

SUMMARY OF THE INVENTION

Axis deviation of the target detection device may occur in a vertical direction of the own vehicle. In a case where axis deviation in the vertical direction occurs in the target detection device, unnecessary collision avoidance control may be performed with respect to a stationary object such as an on-road object which is located below the own vehicle or a structure which is located above the own vehicle. However, Patent Literature 1 does not take into account an occurrence of axis deviation in the vertical direction of the own vehicle.

The present disclosure has been made in view of the above, and a main object of the present disclosure is to provide a vehicle control apparatus capable of suppressing unnecessary support action in a case where axis deviation of a target detection device in the vertical direction occurs.

A vehicle control apparatus in accordance with the present disclosure includes a target detection section, an activation section, an acquisition section, an angle calculation section, and a control section. The target detection section detects at least one target around an own vehicle. The activation section performs collision avoidance control with respect to the at least one target on a basis of a result of detection performed by the target detection section. The acquisition section acquires, at a predetermined cycle, angle deviation information on angular deviation of the target detection section in a vertical direction, the angle deviation information being calculated on a basis of a detection position where the at least one target has been detected by the target detection section. The angle calculation section calculates an axis deviation angle by performing statistical processing of a history of the angle deviation information acquired by the acquisition section after activation of the vehicle control apparatus, the axis deviation angle being an amount of deviation of a mounting angle of the target detection section in the vertical direction. Until a predetermined initial time period elapses after the activation of the vehicle control apparatus, the control section imposes a limitation on the collision avoidance control which is performed via the activation section with respect to, among the at least one target detected by the target detection section, a stationary target which is a target corresponding to a stationary object.

According to the present disclosure, the collision avoidance control with respect to the stationary target is limited until the predetermined initial time period elapses after the activation. In this case, even if axis deviation of the target detection section in the vertical direction has occurred during the initial time period in which calculation accuracy of the axis deviation angle is low, it is possible to suppress an erroneous determination and erroneous action with respect to a stationary target which is present in an upward and downward direction of the own vehicle.

DESCRIPTION OF THE EMBODIMENTS

Figure 1:
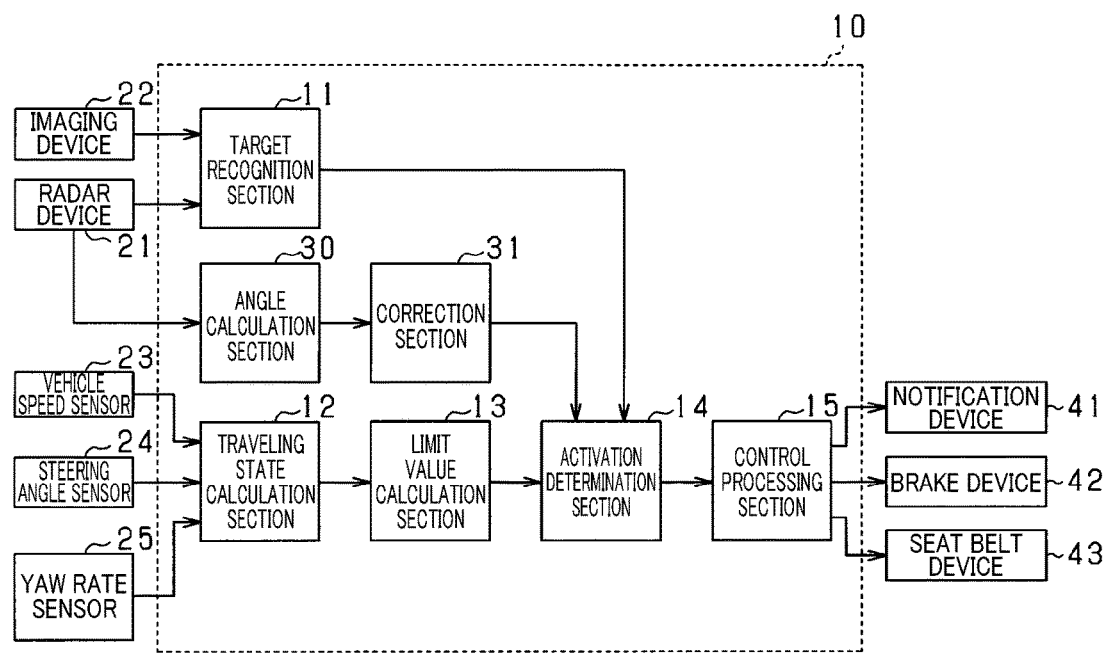
FIG. 1 is a configuration diagram of a vehicle control apparatus.

The following description will discuss embodiments with reference to the drawings. In the following embodiments, the same or equivalent parts are given the same reference numerals in figures and descriptions of the parts given the same reference numerals are referred to.

A vehicle control apparatus in accordance with the present embodiment is provided in a vehicle (own vehicle). The vehicle control apparatus functions as a PCS system for detecting an obstacle (hereinafter referred to as a target) which is present ahead of the own vehicle and performs control for avoiding a collision with the target or reducing damage from the collision.

In FIG. 1, a driving assist ECU 10 which is the vehicle control apparatus is a computer including CPU, ROM, RAM, I/O, and the like. According to the driving assist ECU 10, the CPU executes a program stored in the ROM so that each of these functions is realized.

As sensor devices which accepts various types of detection information, a radar device 21, an imaging device 22, a vehicle speed sensor 23, a steering angle sensor 24, and a yaw rate sensor 25 are connected to the driving assist ECU 10.

Figure 2:
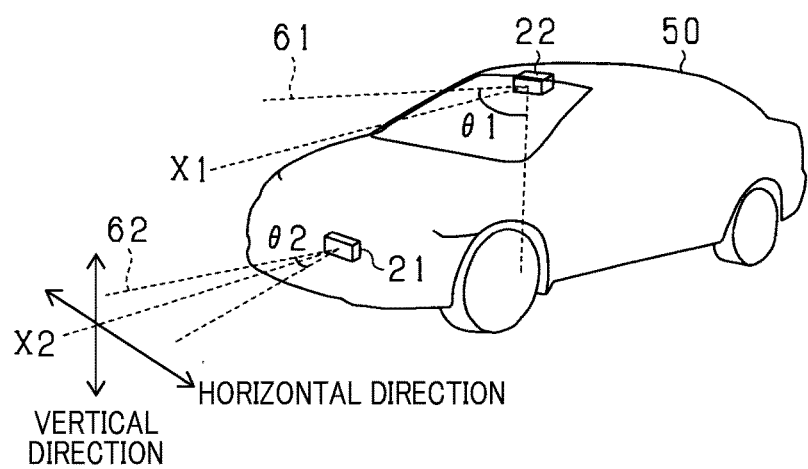
FIG. 2 is a view illustrating an arrangement of an imaging device and a radar device.

The radar device 21 is a device which detects a target by transmitting electromagnetic waves as transmission waves and receiving reflected waves. The radar device 21 is constituted by, for example, millimeter wave radar, laser radar, or the like. As illustrated in FIG. 2, the radar device 21 is provided in a front part of an own vehicle 50 such that an optical axis X2 of the radar device 21 is directed ahead of the vehicle. The radar device 21 scans, by a radar signal, a region 62 which extends ahead of the vehicle at a predetermined angle θ2 around the optical axis X2. According to the present embodiment, a radar beam is scanned in a vertical direction and a horizontal direction (area with the predetermined angle θ2). Distance measurement data is created on the basis of time from when electromagnetic waves are transmitted ahead of the vehicle to when reflected waves are received, and the distance measurement data thus created is transmitted to the driving assist ECU 10. The distance measurement data includes information on a direction (according to the present embodiment, an angle in the vertical direction and an azimuth in the horizontal direction are included) in which the target is present, a distance to the target, and a relative speed of the target to the vehicle. Although omitted in the figures, the radar device 21 is equipped with an actuator capable of correcting the optical axis X2 of the radar device 21 in the vertical direction.

The imaging device 22 is a vehicle-mounted camera and is constituted by a CCD camera, a CMOS sensor, a near infrared camera, or the like. The imaging device 22 captures an image of a surrounding environment including a road on which the own vehicle 50 is traveling, creates image data showing the image thus captured, and sequentially outputs the image data to the driving assist ECU 10. As illustrated in FIG. 2, the imaging device 22 in accordance with the present embodiment is provided, for example, around an upper edge of a windshield of the own vehicle 50 and captures an image of a region 61 which extends ahead of the vehicle at a predetermined angle θ1 (θ1>θ2) around the imaging axis X1. The imaging device 22 then extracts, in the captured image, characteristic points indicating presence of a target. Specifically, the imaging device 22 extracts an edge point on the basis of brightness information of the captured image, and performs a Hough Transform with respect to the edge point thus extracted. In the Hough Transform, for example, points on a straight line on which a plurality of edge points are continuously arranged or points at which straight lines intersect with each other are extracted as characteristic points. The imaging device 22 can be a monocular camera or a stereo camera, The imaging device 22 and the radar device 21 correspond to a target detection section.

The vehicle speed sensor 23 is provided on a rotating shaft which transmits power to wheels of the own vehicle 50. The vehicle speed sensor 23 obtains a speed of the own vehicle 50 on the basis of the number of rotations of the rotating shaft. The steering angle sensor 24 detects, as a steering angle, an angle at which a rotation operation of a steering wheel of the own vehicle 50 is performed. The yaw rate sensor 25 detects a yaw rate which is actually generated in the own vehicle 50, that is, an angular speed around a centroid of the vehicle. The yaw rate sensor 25 includes an oscillator, for example, such as a tuning fork, and detects a yaw rate of the own vehicle 50 by detecting, on the basis of a yaw moment of the own vehicle 50, distortion which has occurred in the oscillator. The vehicle speed sensor 23, the steering angle sensor 24, and the yaw rate sensor 25 detect a traveling state (behavior) of the own vehicle 50.

The own vehicle 50 includes a notification device 41, a brake device 42, and a seat belt device 43 as a safety device which is driven by a control command transmitted by the driving assist ECU 10.

The notification device 41 is a loudspeaker or a display which is provided in a cabin of the own vehicle 50. In a case where the driving assist ECU 10 determines that the own vehicle 50 has become more likely to collide with an obstacle, the notification device 41 notifies a driver of a collision risk by outputting an alarm sound, an alarm message, or the like, on the basis of a control command transmitted by the driving assist ECU 10.

The brake device 42 is a braking device which performs braking of the own vehicle 50. In a case where the driving assist ECU 10 determines that the own vehicle 50 has become more likely to collide with an obstacle, the brake device 42 is activated on the basis of a control command transmitted by the driving assist ECU 10. Specifically, the brake device 42 more increases a braking force which is generated in response to a brake operation performed by the driver (brake assist function), or in a case where the driver has not performed a brake operation, the brake device 42 performs automatic braking (automatic brake function).

The seat belt device 43 is a pretensioner for retracting a seat belt which is provided in each seat of the own vehicle 50. In a case where the driving assist ECU 10 determines that the own vehicle 50 has become more likely to collide with an obstacle, the seat belt device 43 takes preliminary action for retracting the seat belt, on the basis of a control command transmitted by the driving assist ECU 10. In a case where it is impossible to avoid a collision, the seat belt device 43 retracts the seat belt so that slack is removed. Thus, the seat belt device 43 protects an occupant such as a driver by securing the occupant in the seat.

A target recognition section 11 acquires first detection information from the radar device 21 and acquires second detection information from the imaging device 22. The target recognition section 11 then determines presence or absence of a target and a type of the target on the basis of the first and second detection information. Specifically, the target recognition section 11 associates, in the following manner, a first position which is a position acquired from the first detection information with a second position which is a position of a characteristic point acquired from the second detection information. The target recognition section 11 associates, as a position based on a single target, a first position and a second position which are close to each other. In a case where a second position is close to a first position, a target is highly likely to be actually present at the first position. A state in which a position of a target has been able to be accurately acquired by the radar device 21 and the imaging device 22 is referred to as fusion state. With respect to a target which has been determined to be in the fusion state, it is determined, with reference to a detection history, whether the target has been continuously in the fusion state. In a case where it is determined that the target has been continuously in the fusion state, it is determined that the target is present at the position. In a case where the target which has been continuously in the fusion state becomes undetected, it is determined, with reference to the detection history, that the target is present at a previous position for a predetermined time period.

In regard to the target which has been determined to be in the fusion state, pattern matching is performed for the second detection information with use of pattern data which has been prepared in advance. The target recognition section 11 functions as type determination means. The target recognition section 11 determines whether the target is a vehicle or a pedestrian and associates, as a type, a result of the determination with the target. The concept of the pedestrian can also include a bicycle rider.

A traveling state calculation section 12 determines a traveling state of the own vehicle 50 on the basis of results of detection performed by the vehicle speed sensor 23, the steering angle sensor 24, and the yaw rate sensor 25. Specifically, the traveling state calculation section 12 calculates an amount of movement in a lateral direction, an amount of movement in a longitudinal direction, and a rotation angle per unit time of the own vehicle 50, on the basis of a vehicle speed, a yaw rate, and a vehicle centroid slip angle which are provided from the vehicle speed sensor 23, the steering angle sensor 24, and the yaw rate sensor 25. Methods of calculating these parameters are commonly known and detailed descriptions of the methods will be omitted.

An angle calculation section 30 calculates an axis deviation angle which is an amount of deviation of a mounting angle of the radar device 21. The angle calculation section 30 in accordance with the present embodiment determines, among all targets which have been detected by the radar device 21, a target (hereinafter referred to as a stationary target F) corresponding to a stationary object. On the basis of a movement path along which the stationary target F moves relative to the own vehicle 50, the angle calculation section 30 acquires axis deviation information on axis deviation of the radar device 21 in the horizontal and vertical directions. The angle calculation section 30 then stores the axis deviation information in a storage section such as a RAM of the driving assist ECU 10.

The angle calculation section 30 calculates an axis deviation angle of the radar device 21 in the horizontal and vertical directions by performing statistical processing of the axis deviation information on the axis deviation in the horizontal and vertical directions which is stored in the storage section. Specifically, for example, the angle calculation section 30 acquires a plurality of pieces of axis deviation information on axis deviation in the horizontal and vertical directions which has been measured at different times, and performs statistical processing in which, for example, an average value of the plurality of pieces of axis deviation information is calculated. In this manner, a more reliable axis deviation angle in the horizontal and vertical directions is calculated.

Figure 6:
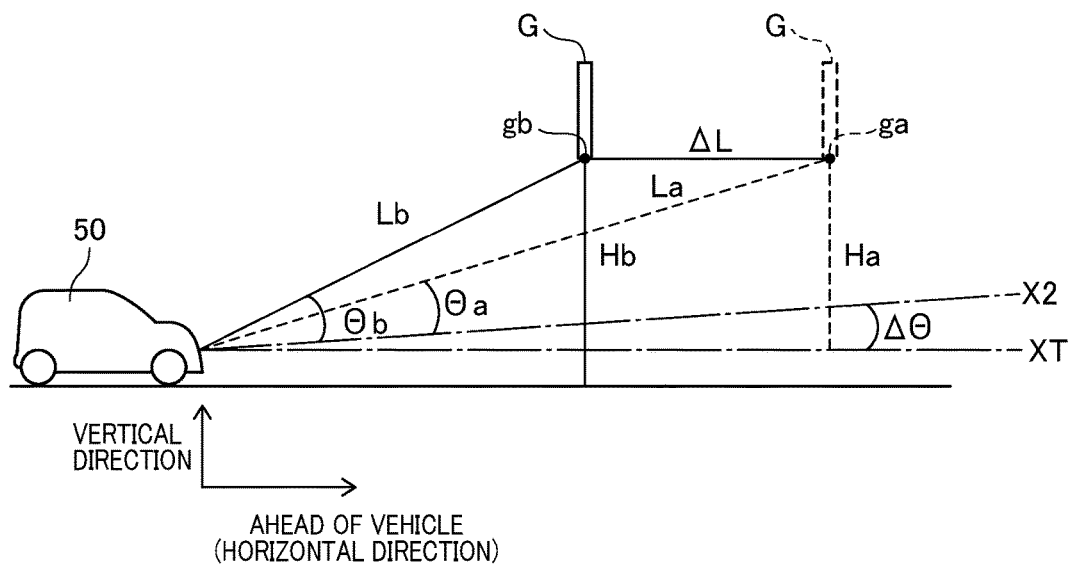
FIG. 6 is an explanatory diagram illustrating an example of detection of axis deviation in the vertical direction.

With reference to FIG. 6, the following description will discuss an example in which axis deviation information on axis deviation of the radar device 21 in the vertical direction is acquired on the basis of the movement path along which the stationary target F moves relative to the own vehicle 50.

In FIG. 6, assume that the optical axis X2 of the radar device 21 deviates by $\Delta\theta$ from an original position XT. When the vehicle 50 travels, a position ga which is detected at time ta for a signboard G provided above and ahead of the vehicle 50 becomes closer to the vehicle 50 so as to make a relative movement to a position gb at time tb. In this case, an axis deviation angle $\Delta\theta$ in the vertical direction can be obtained by formulas (1) to (3) below $$\Delta L = La \times \cos\theta a - Lb \times \cos\theta b \quad (1)$$

$$\Delta H = La \times \sin\theta a - Lb \sin\theta b \quad (2)$$

$$\Delta\theta = \tan^{-1}(\Delta H/\Delta L) \quad (3)$$

Note that $\theta a$ and $\theta b$ are respective angles between the vehicle 50 and the signboard G in the vertical direction at time ta and time t2. Furthermore, La and Lb are respective distances between the vehicle 50 and the signboard G at time ta and time tb. Furthermore, Ha and Hb indicate respective distances from the vehicle 50 to the signboard G in the vertical direction at time ta and time t2. As illustrated in FIG. 6, in a case where the optical axis X2 is not horizontal, the distance in the vertical direction changes depending on movement of the vehicle 50.

Axis deviation in the horizontal direction can be also detected on the basis of a change in azimuth and a publicly known method can be used. A method of calculating an axis deviation angle is not limited to the method using a movement path of a stationary object.

An axis deviation correction section 31 corrects information on a position of a target which is recognized by the driving assist ECU 10, by correcting information on a position of the optical axis X2 of the radar device 21 on the basis of an axis deviation angle in the horizontal and vertical directions outputted from the angle calculation section 30.

A limit value calculation section 13 sets a detection region for detecting a target which is present ahead of the own vehicle 50, in accordance with a traveling state of the vehicle 50 which traveling state is determined by the traveling state calculation section 12. The detection region is a region which is set ahead of a traveling direction of the own vehicle 50. It is determined whether it is possible to perform collision avoidance control with respect to a target included in the detection region.

An activation determination section 14 determines whether a target is present in the detection region set by the limit value calculation section 13. That is, on the basis of corrected information on a position of a target which has been corrected by the axis deviation correction section 31, the activation determination section 14 identifies a target included in the detection region. With respect to the target included in the detection region, the activation determination section 14 calculates time to collision which is time until the own vehicle 50 collides with the target. For example, time to collision is calculated on the basis of a distance and relative speed between the own vehicle 50 and the target. According to the present embodiment, in a case where an initial time period T1 has not elapsed after activation of the angle calculation section 30, the activation determination section 14 determines, in accordance with a type of the target included in the detection region, whether to perform collision avoidance control. The activation determination section 14 corresponds to a control section.

A control processing section 15 compares time to collision calculated by the activation determination section 14 with an activation timing which is individually set for each of the notification device 41, the brake device 42, and the seat belt device 43 which are the safety devices. In a case where the activation determination section 14 determines to perform collision avoidance control and the time to collision is less than the activation timing of each of the safety devices, the control processing section 15 transmits a command signal to a relevant safety device. Accordingly, at least one of the safety devices, namely, the notification device 41, the brake device 42, and the seat belt device 43 is activated so that the driver is notified of a collision risk. The control processing section 15 corresponds to an activation section.

Figure 3:
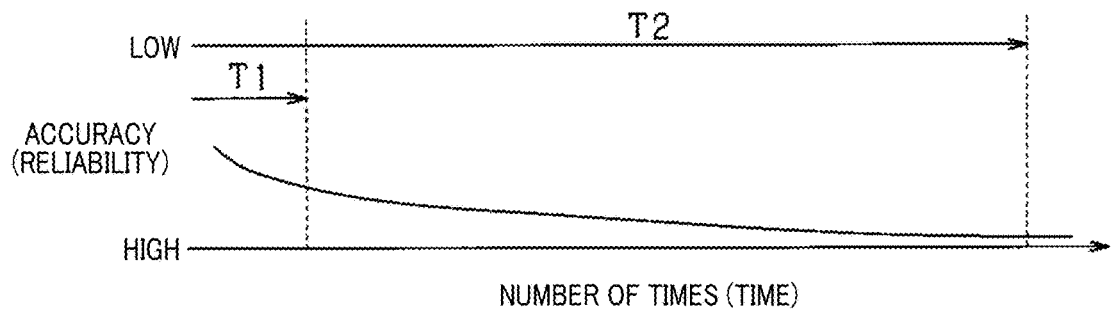
FIG. 3 is a view showing a relationship between detection time and detection accuracy of axis deviation.

In a case where an axis deviation angle is calculated. by performing statistical processing of a history of axis deviation information, as shown in FIG. 3, until a predetermined time period (hereinafter referred to as an initial time period T1) elapses after activation of the driving assist ECU 10, calculation accuracy of the axis deviation angle is low, and thus an axis deviation angle cannot be calculated or even if an axis deviation angle is calculated, accuracy of the calculation is low. That is, the axis deviation angle is uncertain.

Figure 4A:
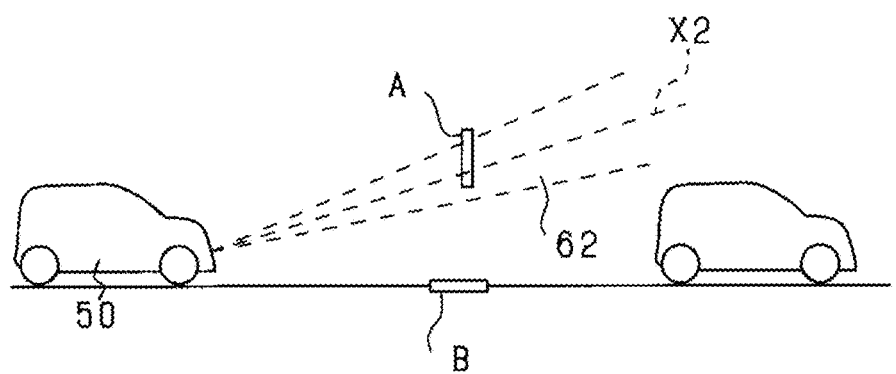
FIG. 4A is an explanatory diagram of axis deviation of the radar device in a vertical direction.
Figure 4B:
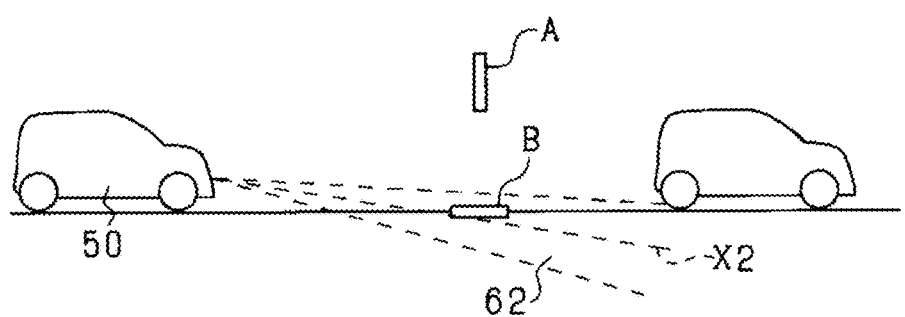
FIG. 4B is another explanatory diagram of axis deviation of the radar device in a vertical direction.

Accordingly, during the initial time period T1, in a case where axis deviation in the vertical direction has occurred in the radar device 21, an on-road object which is located below the own vehicle 50, a structure which is located above the own vehicle 50, or the like may be erroneously determined to be located ahead (on a traveling course) of the own vehicle 50. For example, as illustrated in FIG. 4A, in a case where upward axis deviation has occurred in the radar device 21, an overhead structure A such as a tunnel or a viaduct may be erroneously determined to be located ahead of the own vehicle 50. As illustrated FIG. 4B, in a case where downward axis deviation has occurred in the radar device 21, an on-road object B, such as a manhole, which is located on the road may be erroneously determined to be located ahead of the own vehicle 50.

Thus, according to the present embodiment, among a target (hereinafter referred to as a moving target) corresponding to a moving object and a target (hereinafter referred to as a stationary target) corresponding to a stationary object which have been detected by the radar device 21, collision avoidance control with respect to the stationary target is limited before the initial time period T1 elapses. That is, in view of a fact that a target which is subject to collision avoidance control ahead of the own vehicle 50 is mainly a moving object such as a preceding vehicle or a pedestrian, a limitation is imposed on the collision avoidance control with respect to the stationary target. For example, a limitation is imposed on activation of at least one of the notification device 41, the brake device 42, and the seat belt device 43 with respect to the stationary target.

In this case, even if axis deviation in the vertical direction has occurred in the radar device 21 before the initial time period T1 elapses, it is possible to suppress unnecessary support action with respect to a stationary target which is located in an upward and downward direction of the own vehicle 50. After the initial time period T1 elapses and when the axis deviation information is accumulated so that it becomes possible to calculate an axis deviation angle of the radar device 21 with predetermined accuracy, the limitation on the collision avoidance control with respect to the stationary target is removed.

The following description will discuss a process which is performed by the driving assist ECU 10. The process described below is repeatedly performed by the driving assist ECU 10 at a predetermined cycle after an ignition switch (omitted in the figures) is turned on.

Figure 5:
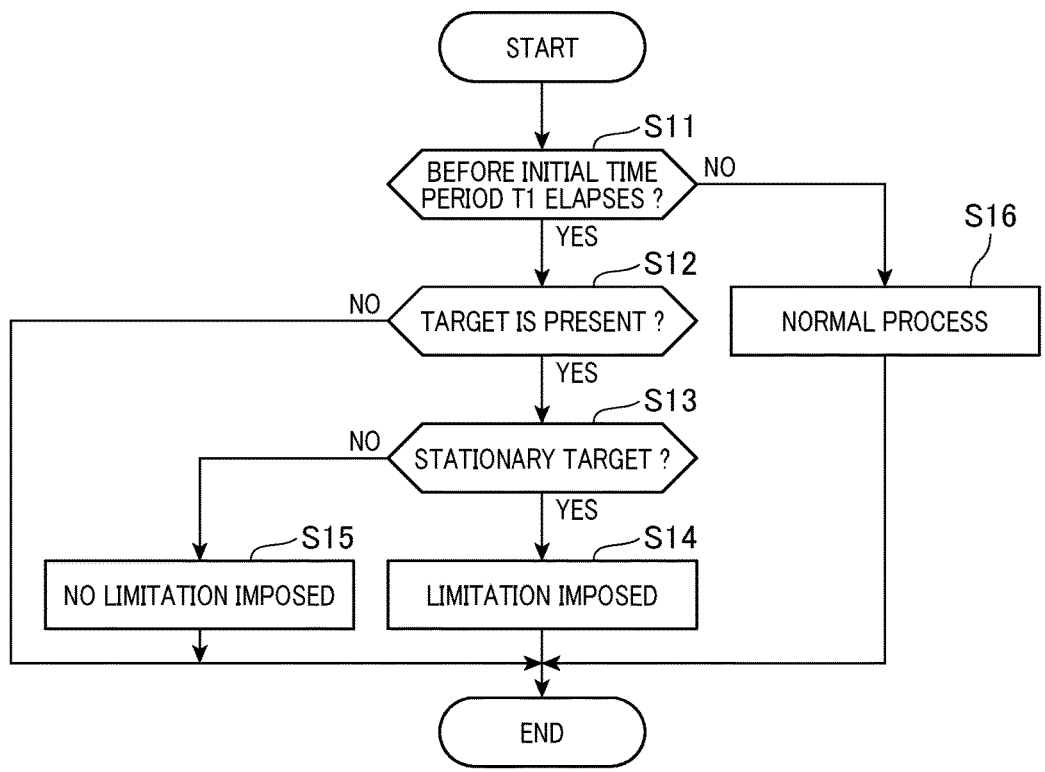
FIG. 5 is a flowchart showing a procedure of processes performed by a driving assist ECU.

In FIG. 5, it is determined whether it is before the initial time period T1 elapses (S11). In a case where an affirmative determination is made in S11, it is determined whether a target is present in the detection region (S12). In a case where it is determined that no target is present in the detection region, the process is ended. In a case where it is determined in S12 that a target is present in the detection region, it is determined whether the target is a stationary target (S13). In a case where it is determined that the target is a stationary target, a limitation is imposed on collision avoidance control with respect to the stationary target among targets in the detection region (S14). In a case where it is determined that the target is not a stationary target, no limitation is imposed on the collision avoidance control with respect to the targets in the detection region (S15). In a case where a negative determination is made in S11, that is, in a case where the initial time period T1 has elapsed, a normal process in which no limitation is imposed on the collision avoidance control with respect to the stationary target is performed (S16). That is, in the normal process, the limitation on the collision avoidance control with respect to the stationary target is removed so that the collision avoidance control is performed in a similar manner regardless of the target is a moving target or a stationary target.

The aforementioned configuration brings about the following good effects.

According to a configuration in which an axis deviation angle is calculated by performing statistical processing of a history of deviation information acquired after the driving assist ECU 10 is activated, until the predetermined initial time period T1 elapses after the activation, presence or absence of axis deviation of the radar device 21 in the vertical direction has not been determined, or even in a case where presence or absence of the axis deviation in the vertical direction has been determined, accuracy of the determination is low. Accordingly, during the initial time period, in a case where a mounting angle of the radar device 21 is deviated in the vertical direction, unnecessary collision avoidance control may be performed with respect to a target which is located in the upward and downward direction of the own vehicle 50. Among targets which are present ahead of the own vehicle, a target which is subject to collision avoidance control is mainly a preceding vehicle or the like. Thus, the collision avoidance control with respect to the stationary target is limited until the predetermined initial time period elapses after the activation. In this case, even if axis deviation in the vertical direction has occurred in the radar device 21 during the initial time period T1 in which calculation accuracy of the axis deviation angle is low, it is possible to suppress an erroneous determination and erroneous action with respect to a stationary target which is present in the upward and downward direction of the own vehicle 50.

Since calculation accuracy of the axis deviation angle of the radar device 21 is improved after the initial time period T1 elapses, the limitation on the collision avoidance control is removed with respect to a target corresponding to the stationary object. This makes it possible to perform the collision avoidance control on the basis of a result of calculation of the axis deviation angle of the target detection device.

The present invention is not limited to the aforementioned configuration and can be implemented as below.

According to the aforementioned configuration, during the initial time period T1, it is possible to exclude, from a subject for which a limitation is imposed on the collision avoidance control, a stationary target which has been detected by both of the imaging device 22 and the radar device 21, because such a stationary target is highly likely to be present ahead (on the traveling course) of the own vehicle 50. That is, during the initial time period T1, it is possible to impose a limitation only on collision avoidance control with respect to a stationary target detected only by the radar device 21, out of the imaging device 22 and the radar device 21.

According to the aforementioned configuration, during the initial time period T1, it is possible to cause a stationary target which is present in the upward and downward direction of the own vehicle 50 to become less likely to be detected, by limiting the detection region in which a target is detected by the radar device 21. That is, it is possible to limit a distance (distance in the traveling direction of the own vehicle 50) in a depth direction of the detection region which is set by the limit value calculation section 13. This causes a target which is located distant from the own vehicle 50 in the upward and downward direction to become less likely to be detected. This makes it possible to improve an effect of suppressing unnecessary collision avoidance control with respect to a stationary target which is located above or below the own vehicle 50.

The process shown in FIG. 5 can be performed as below. That is, in a case where a target is detected before the initial time period T1 elapses, it is determined, with use of information on a position of the target, whether there is axis deviation in the vertical direction, and only in a case where there is a possibility that axis deviation in the vertical direction has occurred, a limitation is imposed on support action with respect to a stationary target. For example, the process can be performed as below. That is, in a case where a target is detected before the initial time period T1 elapses, an angle of the optical axis X2 of the radar device 21 in the vertical direction is calculated on the basis of a movement path of the target. Then, in a case where it is detected that the optical axis X2 of the radar device 21 deviates by a predetermined value or more in the vertical direction with respect to the imaging axis X1 of the imaging device 22, a limitation is imposed on collision avoidance control with respect to a stationary target. Meanwhile, in a case where the imaging axis X1 of the imaging device 22 substantially coincides with the optical axis X2 of the radar device 21, no limitation is imposed on the collision avoidance control with respect to the stationary target.

REFERENCE SIGNS LIST

10: Driving assist ECU, 15: Control processing section, 30: Angle calculation section, 50: Own vehicle.

The invention claimed is:

1. A vehicle control apparatus comprising:
 a target detection section for detecting at least one target around an own vehicle;
 an activation section for performing collision avoidance control with respect to the at least one target on a basis of a result of detection performed by the target detection section;
 an acquisition section for acquiring, at a predetermined cycle, angle deviation information on angular deviation of the target detection section in a vertical direction, the angle deviation information being calculated on a basis of a detection position where the at least one target has been detected by the target detection section;
 an angle calculation section for calculating an axis deviation angle by performing statistical processing of a history of the angle deviation information acquired by the acquisition section after activation of the vehicle control apparatus, the axis deviation angle being an amount of deviation of a mounting angle of the target detection section in the vertical direction; and
 a control section for, until a predetermined initial time period elapses after the activation of the vehicle control apparatus, imposing a limitation on the collision avoidance control which is performed with respect to, among the at least one target detected by the target detection section, a stationary target which is a target corresponding to a stationary object and imposing no limitation on the collision avoidance control which is performed with respect to a target other than the stationary target.

2. The vehicle control apparatus according to claim 1 wherein the control section removes the limitation on the collision avoidance control with respect to the stationary target after the predetermined initial time period elapses.

3. The vehicle control apparatus according to claim 1, further comprising:
 a vertical axis deviation determination section for determining whether there is axis deviation of the target detection section in the vertical direction,
 in a case where the vertical axis deviation determination section determines that there is the axis deviation in the vertical direction, the control section imposing a limitation on the collision avoidance control with respect to the stationary target until the predetermined initial time period elapses after the activation of the vehicle control apparatus.

4. The vehicle control apparatus according to claim 1, further comprising:
 a second target detection section for detecting a target around the own vehicle,
 in a case where the second target detection section has detected a stationary target, the control section removing the limitation.

5. A vehicle control method which is applied to a vehicle equipped with a target detection section for detecting at least one target around an own vehicle,
 the vehicle control method comprising:
 an acquisition step of acquiring, at a predetermined cycle, angle deviation information on angular deviation of the target detection section in a vertical direction, the angle deviation information being calculated on a basis of a detection position where the at least one target has been detected by the target detection section;
 an angle calculation step of calculating an axis deviation angle for the angle deviation information, the axis deviation angle being an amount of deviation of a mounting angle of the target detection section in the vertical direction;
 an execution step which is executed by a vehicle control apparatus for performing collision avoidance control with respect to the at least one target on a basis of a result of detection performed by the target detection section; and
 a control step of, until a predetermined initial time period elapses after activation of the vehicle control apparatus, imposing a limitation on the collision avoidance control which is performed with respect to, among the at least one target detected by the target detection section, a stationary target which is a target corresponding to a stationary object and imposing no limitation on the collision avoidance control which is performed with respect to a target other than the stationary target.

6. A vehicle control apparatus which is applied to a vehicle equipped with a target detection section for detecting at least one target around an own vehicle, the vehicle control apparatus comprising:
 a memory;
 a processor communicable to the memory; and
 a set of computer-executable instructions stored on the memory that cause the processor to implement:
  performing collision avoidance control with respect to the at least one target on a basis of a result of detection performed by the target detection section;
  acquiring, at a predetermined cycle, angle deviation information on angular deviation of the target detection section in a vertical direction, the angle deviation information being calculated on a basis of a detection position where the at least one target has been detected by the target detection section;
  calculating an axis deviation angle by performing statistical processing of a history of the angle deviation information acquired after activation of the vehicle control apparatus, the axis deviation angle being an amount of deviation of a mounting angle of the target detection section in the vertical direction; and
 until a predetermined initial time period elapses after the activation of the vehicle control apparatus, imposing a limitation on the collision avoidance control which is performed with respect to, among the at least one target detected by the target detection section, a stationary target which is a target corresponding to a stationary object and imposing no limitation on the collision avoidance control which is performed with respect to a target other than the stationary target.

* * * * *